United States Patent Office 3,567,427
Patented Mar. 2, 1971

3,567,427
CHEMICAL DISAGGREGATION OF ROCK
Ray V. Huff and Larman J. Heath, Bartlesville, Okla.,
assignors to the United States of America as represented by the Secretary of the Interior
No Drawing. Filed Nov. 7, 1968, Ser. No. 774,172
Int. Cl. B02c 19/12, 19/18
U.S. Cl. 75—1                                    10 Claims

ABSTRACT OF THE DISCLOSURE

Rock containing certain clay minerals is chemically disaggregated by treatment with a compound which causes a rupturing or negation of the bonding between unit cells of the clay mineral. The clay minerals may be illite, illite-type, mixed lattice minerals of the illite type or mixture thereof. The treatment compound may be hydrazine, hydrogen peroxide or mixtures thereof. The treatment of the clay minerals may be in situ.

BACKGROUND OF THE INVENTION

Disaggregation of rock finds use in a number of areas including mining, ore dressing and hydrocarbon production. In specialized situations, chemical disaggregation of rock is advantageous as compared to mechanical disaggregation. Chemical disaggregation is normally accomplished by dissolving the cement binding individual particles making up the rock. Probably the most common example of chemical disaggregation is in the acid leaching of a siliceous sandstone bound together with a carbonate cement.

We have previously found that rocks which contain intercalation compound-forming clay minerals such as kaolinite intimately dispersed throughout the rock as a cementing or indurating material may be disaggregated or fractured by treatment with an intercalation product-forming compound. Molecules of these compounds enter between individual kaolinite unit cells to form a complex which distends the lattice structure of the clay. The resulting expansion is believed to create sufficiently high internal stresses to physically rupture the rock. This process is disclosed and claimed in our copending application, Ser. No. 774,174, now U.S. Pat. No. 3,508,613, filed of even date herewith. That process is limited, however, to specific types of clay minerals.

SUMMARY OF THE INVENTION

It has now been found that rocks which contain certain clay minerals, exemplified by those of the illite type, intimately dispersed throughout the rock as a cementing or indurating material may be disaggregated by treatment with solutions of hydrogen peroxide or hydrazine.

Hence it is an object of this invention to cause disaggregation of rocks by chemical means.

It is a further object of this invention to react clay minerals dispersed throughout a rock with a disaggregation-causing compound.

A specific object of this invention is to treat mineral ores with a disaggregation-causing compound to reduce or eliminate milling operations and to otherwise aid in the mining and processing of minerals.

DETAILED DESCRIPTION OF THE INVENTION

The method of this invention consists of the treatment of rocks containing particular types of clay with a disaggregation-causing compound. Compounds which have been found to cause disaggregation include hydrazine and hydrogen peroxide. Rocks amenable to treatment by the process must have sufficient porosity and permeability to allow the treating compound to penetrate, must contain at least small quantities of clay-type minerals and must have the clay content distributed throughout the rock, preferably at or between the contacts of the particles making up the rock. Clay minerals which cause disaggregation of host rock upon chemical treatment are exemplified by illite, illite-type clays, mixed lattice clay minerals of the illite type and mixtures of these with other clay minerals.

Solutions of hydrazine, hydrogen peroxide, mixtures of the two and mixtures of either or both with salts and organic compounds are contemplated for use in the process. Rocks may be treated simply by immersion in the compound or the compound may be forced into the rock by hydrostatic pressure. This last method finds particular use in the treatment of rock in situ as in the hydraulic mining of ore bodies.

Illite is an example of a clay mineral which reacts with disaggregation-causing chemicals. An illite unit cell is composed of two silicon-oxygen tetrahedral sheets sandwiching an aluminum-oxygen-hydroxyl octahedral sheet in much the same fashion as the unit cell of montmorillonite. Adjacent unit cells of illite are separated and bound together with potassium atoms rather than being separated by layers of water molecules as is the case with montmorillonite.

Illite may also be described as a clay mica. There appears to be a continuous series from igneous and metamorphic micas, such as muscovite, biotite and phlogopite, through illites, mixed lattice clay minerals and finally to montmorillonite. Proceeding down the series, the percentage of fixed or nonexchangeable potassium decreases; illites containing an intermediate percentage of potassium. The type of clay minerals which react with hydrazine and hydrogen peroxide appear to be related to the percentage of nonexchangeable potassium contained in the clay. However, the reaction mechanism occurring is not well understood at this time.

The actual reaction occurring between hydrazine and illite, for example, does not appear to be an intercalation reaction such as occurs between hydrazine and kaolinite. No swelling of the rock sample occurs and no distention of the crystal lattice can be detected by X-ray analysis. Thus, disaggregation does not appear to be caused by expansion and build-up of internal pressures but rather by a rupturing or negation of the bonding between unit cells of the clay mineral.

Concentration of the treating agent and reaction temperatures are not critical. It is preferred, however, to carry out the process at ambient temperatures, particularly when using hydrogen peroxide which decomposes at an accelerating rate at high temperature. Effective concentrations of the treating compounds may range broadly from about 5 to 100%. When using hydrogen peroxide, it is preferred to use concentrations in the range of about 10 to 50% while preferred concentrations of hydrazine range from about 15 to 80%.

Following is a description by way of example of specific treating methods useful in practicing the present invention.

EXAMPLE 1

A sample of copper ore composed primarily of illite and gypsum and containing 3.0% copper in the form of chalcocite was immersed in hydrazine hydrate at room temperature for one hour. At the end of that time disaggregation was essentially complete. Excess liquid was decanted off and the disaggregated ore was washed with water through standard sieves. Each sized fraction was then dried, weighed and analyzed for its copper content using flame spectrometry. Results of the analyses are as follows:

TABLE

| Sieve size | Wt. percent of original sample retained | Copper concentration, percent |
|---|---|---|
| 48 | 1.9 | 8.5 |
| 200 | 6.9 | 6.0 |
| 270 | 5.5 | 2.2 |
| 325 | 3.3 | 2.3 |
| 400 | 9.7 | 1.7 |
| Pan | 68.1 | 3.9 |

Loss of sample during the disaggregation, screening and drying steps of the analysis procedure totaled 4.6% having a calculated copper concentration of 2.0%. As may be seen from the table, significant concentration of the copper occurred merely by screening. This is considered to reflect the size distribution of chalcocite particles in the ore.

EXAMPLE 2

Another sample of the same ore as that used in Example 1 was immersed in 15 and 30% aqueous hydrogen peroxide solutions. Results similar to those in Example 1 were obtained.

EXAMPLE 3

Samples of an illitic shale were immersed in an aqueous hydrazine solution. The shale did not swell but essentially complete disaggregation occurred.

EXAMPLE 4

Samples of the illitic shale used in Example 3 were immersed in aqueous hydrogen peroxide solution. Again disaggregation but not swelling occurred.

EXAMPLE 5

Samples of illitic shale used in Example 3 were immersed in alcoholic and aqueous potassium acetate solutions. The shale was apparently unaffected by the treatment. It must be noted that potassium acetate readily enters into intercalation reactions with kaolinitic-type clays.

EXAMPLE 6

A kaolin-containing sandstone, which readily enters into an intercalation reaction with hydrazine resulting in swelling and disaggregation, was immersed in aqueous hydrogen peroxide solutions. The rock sample was apparently unaffected by the treatment.

Based upon experimental data such as that shown in the examples, it is concluded that the reaction of hydrazine and hydrogen peroxide with illitic-type clays is not an intercalation reaction. No evidence of intercalation complex formation was detected by X-ray analysis; no swelling of rock samples, typical of the intercalation reaction, was observed; known intercalation-product-forming compounds other than hydrazine did not react with illite-type clays and hydrogen peroxide did not form intercalation complexes with kaolintic clays.

The examples presented are illustrative of the scope and usefulness of the invention. Numerous other uses will be apparent to those skilled in the art.

What we claim is:

1. A process for the disaggregation of a host rock containing at least small quantities of clay minerals chosen from the group consisting of illite, illite-type clays, mixed lattice minerals of the illite type and mixtures thereof which comprises contacting the rock with a disaggregation-causing compound chosen from the group consisting of hydrazine, hydrogen peroxide and mixtures thereof.

2. The process of claim 1 wherein the host rock is composed of mineral particles cemented or indurated by the clay minerals.

3. The process of claim 2 wherein the host rock is contacted in situ with the disaggregation-causing compound.

4. The process of claim 2 wherein the host rock is contacted by immersion in the disaggregation-causing compound.

5. The process of claim 4 wherein the disaggregation-causing compound is an aqueous solution of hydrazine having a concentration in the range of about 15 to about 80%.

6. The process of claim 4 wherein the disaggregation-causing compound is an aqueous solution of hydrogen peroxide having a concentration in the range of about 10 to about 50%.

7. The process of claim 4 wherein the host rock is chosen from the group consisting of illitic shales and illite containing metal ores.

8. The process of claim 7 wherein the host rock is a metal ore and wherein the host rock is subjected to a physical sizing step after disaggregation.

9. The process of claim 8 wherein the disaggregation-causing compound is an aqueous solution of hydrazine having a concentration in the range of about 15 to about 80%.

10. The process of claim 8 wherein the disaggregation-causing compound is an aqueous solution of hydrogen peroxide having a concentration in the range of about 10 to about 50%.

References Cited

UNITED STATES PATENTS 3,309,211   3/1967   Weiss _____ 106—72

DONALD G. KELLY, Primary Examiner

U.S. Cl. X.R.
241—1, 4; 299—10